United States Patent
Feld et al.

(10) Patent No.: US 12,356,084 B2
(45) Date of Patent: Jul. 8, 2025

(54) COLOR FILTER ARRAY FOR DE-MOSAICING AND BINNING

(71) Applicant: SAMSUNG ELECTRONICS CO., LTD., Suwon-si (KR)

(72) Inventors: Tal Michael Feld, Tel Aviv (IL); Gal Bitan, Tel Aviv (IL); Igal Avishai, Tel Aviv (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 203 days.

(21) Appl. No.: 17/664,681

(22) Filed: May 24, 2022

(65) Prior Publication Data
US 2023/0388662 A1    Nov. 30, 2023

(51) Int. Cl.
*H04N 23/84* (2023.01)
*H04N 25/13* (2023.01)
*H04N 25/46* (2023.01)

(52) U.S. Cl.
CPC ......... *H04N 23/843* (2023.01); *H04N 25/134* (2023.01); *H04N 25/46* (2023.01)

(58) Field of Classification Search
CPC ..... H04N 23/843; H04N 25/134; H04N 25/46
See application file for complete search history.

(56) References Cited

U.S. PATENT DOCUMENTS

| | | | |
|---|---|---|---|
| 7,414,630 B2 | 8/2008 | Schweng et al. | |
| 7,745,779 B2 | 6/2010 | Conners | |
| 8,704,921 B2 | 4/2014 | Ishiwata et al. | |
| 9,184,195 B2 | 11/2015 | Hayashi et al. | |
| 9,185,375 B2 | 11/2015 | Tanaka et al. | |
| 9,369,681 B1 | 6/2016 | Wu et al. | |
| 9,374,544 B2 | 6/2016 | Kurahashi | |
| 10,666,881 B2 | 5/2020 | Kaneko et al. | |
| 2002/0063789 A1 | 5/2002 | Acharya et al. | |
| 2007/0223819 A1* | 9/2007 | Yamamoto | G06V 10/7515 382/218 |
| 2011/0012011 A1 | 1/2011 | Jung et al. | |
| 2011/0317053 A1* | 12/2011 | Hiramoto | H04N 25/53 348/E5.091 |

(Continued)

FOREIGN PATENT DOCUMENTS

EP    2683167    8/2014

OTHER PUBLICATIONS

AND9180/D, "Sparse Color Filter Pattern Overview", https://www.onsemi.com/pub/Collateral/AND9180-D.PDF, Jan. 2018.

(Continued)

*Primary Examiner* — Antoinette T Spinks
(74) *Attorney, Agent, or Firm* — MORGAN, LEWIS & BOCKIUS LLP

(57) ABSTRACT

A pixel array of an image sensor includes a plurality of color filter array (CFA) cells. Each of the plurality of CFA cells includes first, second, third, and fourth CFA blocks. Each of the first and second CFA blocks includes a plurality of pixels to sense light of a first color. Most pixels of the third CFA block are configured to sense the second color and the third CFA block includes at least one first pixel to sense the first light. Most pixels of the fourth CFA block are configured to sense a third color of light and the fourth CFA block includes at least one second green pixel to sense the first light.

11 Claims, 15 Drawing Sheets

(56) References Cited

U.S. PATENT DOCUMENTS

| | | | | |
|---|---|---|---|---|
| 2014/0307140 A1* | 10/2014 | Hayashi | ............... | H04N 23/843 |
| | | | | 348/281 |
| 2015/0271461 A1* | 9/2015 | Hayashi | ............... | H04N 25/134 |
| | | | | 348/223.1 |
| 2017/0347042 A1* | 11/2017 | Borthakur | ............ | H04N 23/672 |
| 2018/0146148 A1* | 5/2018 | Kaneko | ................ | H04N 25/778 |
| 2021/0243413 A1 | 8/2021 | Park et al. | | |
| 2021/0392303 A1* | 12/2021 | Park | ...................... | G06T 3/4015 |
| 2023/0105793 A1* | 4/2023 | Park | .................... | H04N 25/134 |
| | | | | 348/207.99 |
| 2023/0232136 A1* | 7/2023 | Jang | .................... | H04N 25/134 |
| | | | | 348/207.99 |

OTHER PUBLICATIONS

K. Gorokhovskiy et al., "Alternative color filter array layouts for digital photography", IEEE Xplore, Sep. 11, 2006.
Keigo Hirakwawa, et al., "Spatio-Spectral Color Filter Array Design for Optimal Image Recovery", IEEE Transactions on Image Processing, vol. 17, No. 10, Oct. 2008, pp. 1876-1890.
Yan Li, et al., Color Filter Arrays: A Design Methodology, May 2008.

\* cited by examiner

FIG. 9A
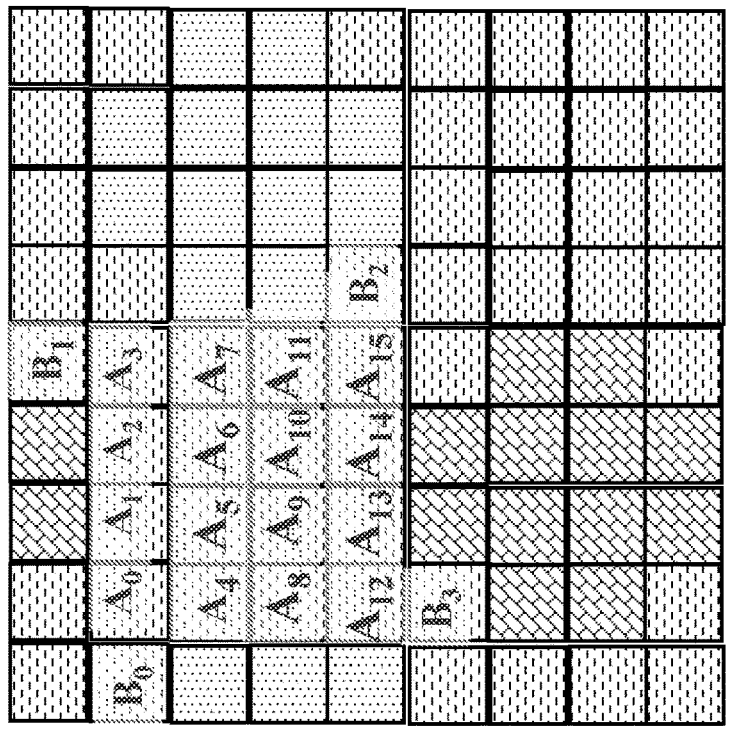
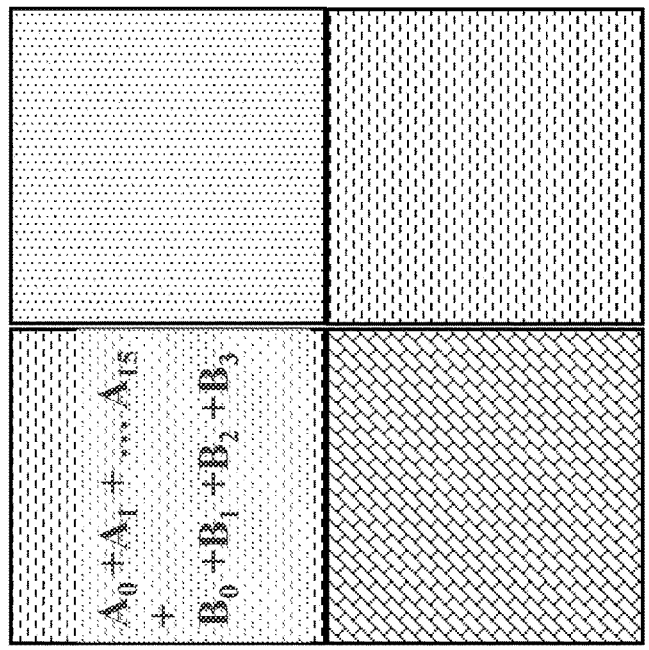

FIG. 9B
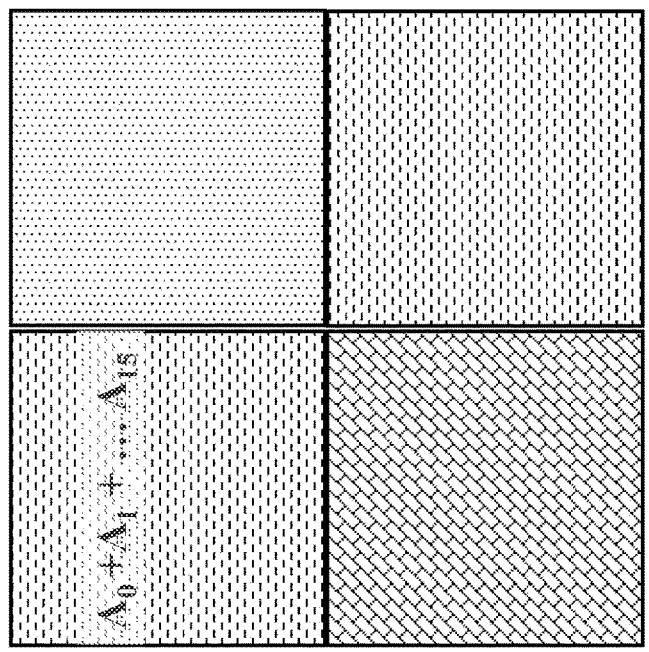
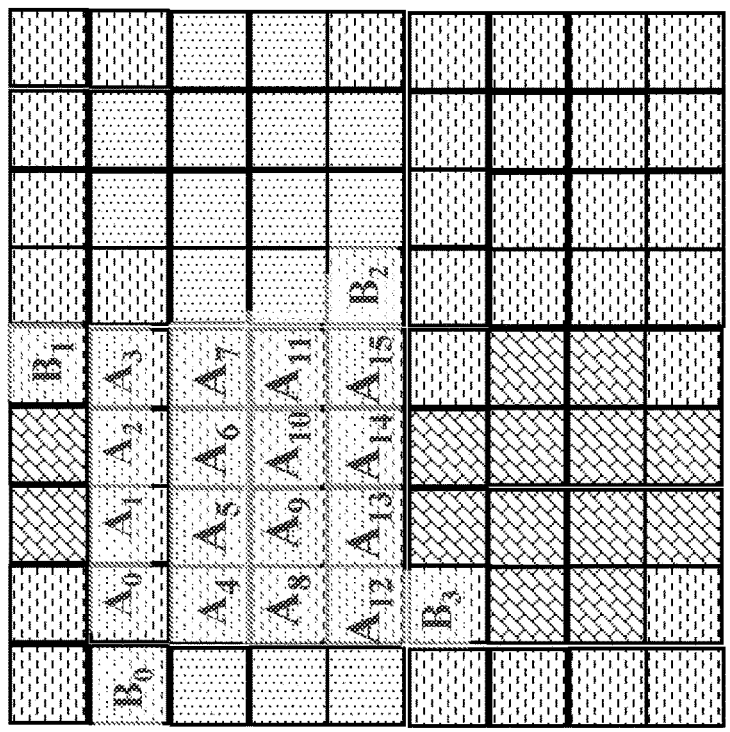

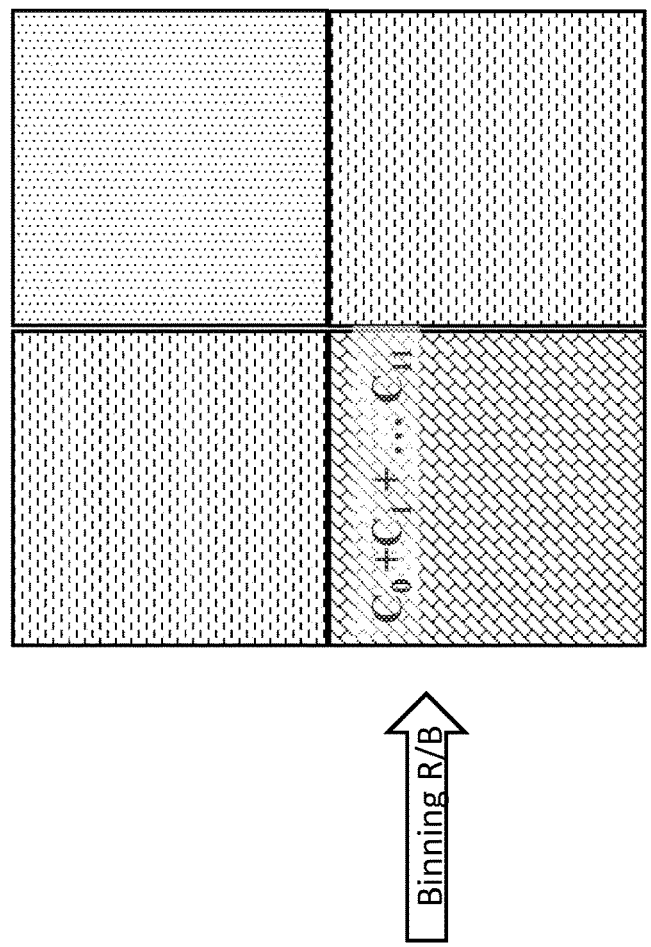
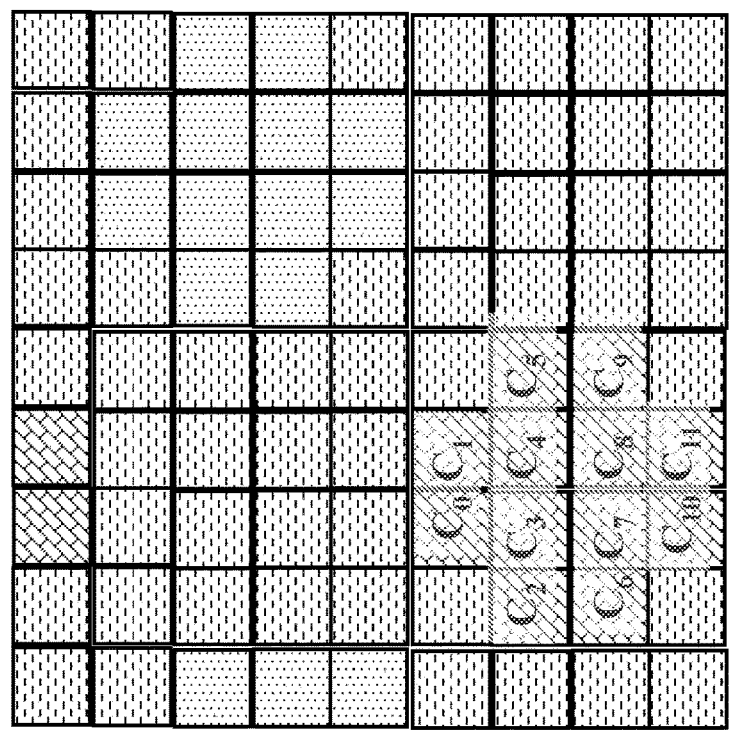
FIG. 9C

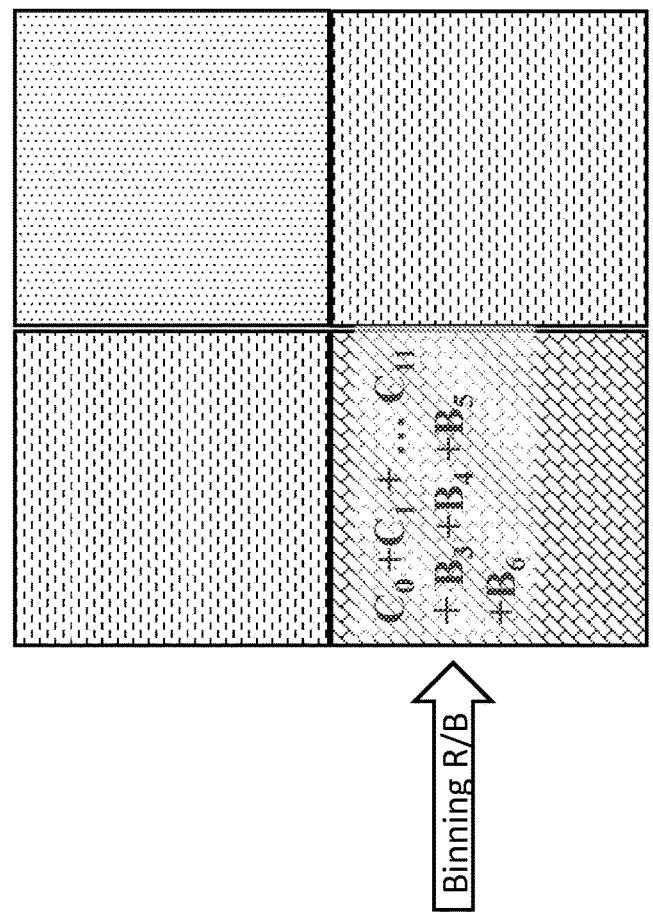
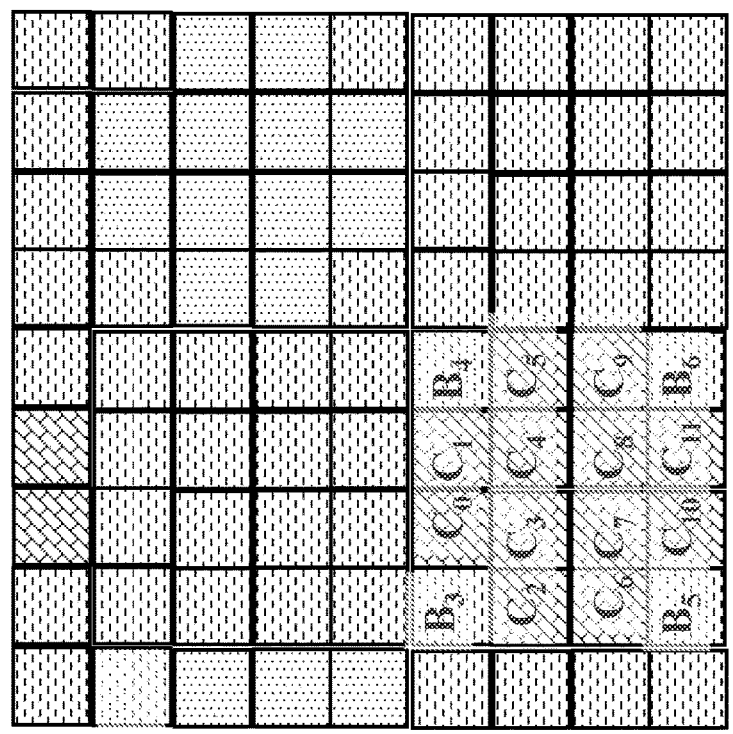
FIG. 9D

COLOR FILTER ARRAY FOR DE-MOSAICING AND BINNING

1. TECHNICAL FIELD

Exemplary embodiments of the present inventive concept relate to image sensors, and more particularly to pixel arrays for enhanced low light performance and de-mosaicing.

2. DISCUSSION OF RELATED ART

Image sensors capture a two-dimensional (2D) or three-dimensional (3D) image of an object. Image sensors generate an image of an object using a photoelectric conversion element, which reacts to the intensity of light reflected from the object. With the recent development of complementary metal-oxide semiconductor (CMOS) technology, a CMOS image sensor (CIS) using CMOS has been widely used.

Image sensors may include a pixel array. When image sensors have a higher pixel count, the pixel array may include more color pixels. To convert a raw image output from an image sensor into a certain pattern such as a red-blue-green (RGB) image, a de-mosaic process based on interpolation and/or extrapolation may be performed. Since pixel data read from an image sensor may include, binning may be used to increase a signal to noise ratio (SNR).

SUMMARY

According to an exemplary embodiment of the disclosure, a pixel array of an image sensor includes a plurality of color filter array (CFA) cells. Each of the plurality of CFA cells includes first, second, third, and fourth CFA blocks. Each of the first and second CFA blocks includes a plurality of pixels to sense light of a first color. Most pixels of the third CFA block are configured to sense light of a second color and the third CFA block includes at least one first pixel to sense light of the first color. Most pixels of the fourth CFA block are configured to sense light of a third color and the fourth CFA block includes at least one second pixel to sense light of the first color.

According to an exemplary embodiment of the disclosure, a pixel array of an image sensor includes a plurality of color filter array (CFA) cells. Each of the plurality of CFA cells includes a first pattern, a second pattern, and a third pattern. The first pattern includes a plurality of first pixels to sense light of a first color, the first pixels including pixels arranged in an N×N matrix and pixels adjacent respective corners of the matrix, where N is at least 2. The second pattern includes a plurality of second pixels numbering less than the first pixels to sense light of a second color. The third pattern includes a plurality of third pixels numbering less than the first pixels to sense light of a third color.

According to an exemplary embodiment of the disclosure, a pixel array of an image sensor includes a plurality of color filter array (CFA) cells. Each of the plurality of CFA cells including a first pattern, a second pattern, and a third pattern. The first pattern includes a plurality of first pixels to sense light of a first color, the first pixels including pixels arranged in an N×N matrix and pixels adjacent respective corners of the matrix, where N is at least 2. the second pattern includes a plurality of second pixels arranged into a plus shape to sense light of a second color. the third pattern includes a plurality of third pixels arranged into the plus shape to sense light of a third color.

BRIEF DESCRIPTION OF THE DRAWINGS

The present inventive concept will become more apparent by describing in detail exemplary embodiments thereof with reference to the attached drawings, in which:

FIG. 9A-9D illustrate binning that may be performed on pixel data of the pixel array according to an exemplary embodiment of the inventive concept:

DETAILED DESCRIPTION

Figure 1:
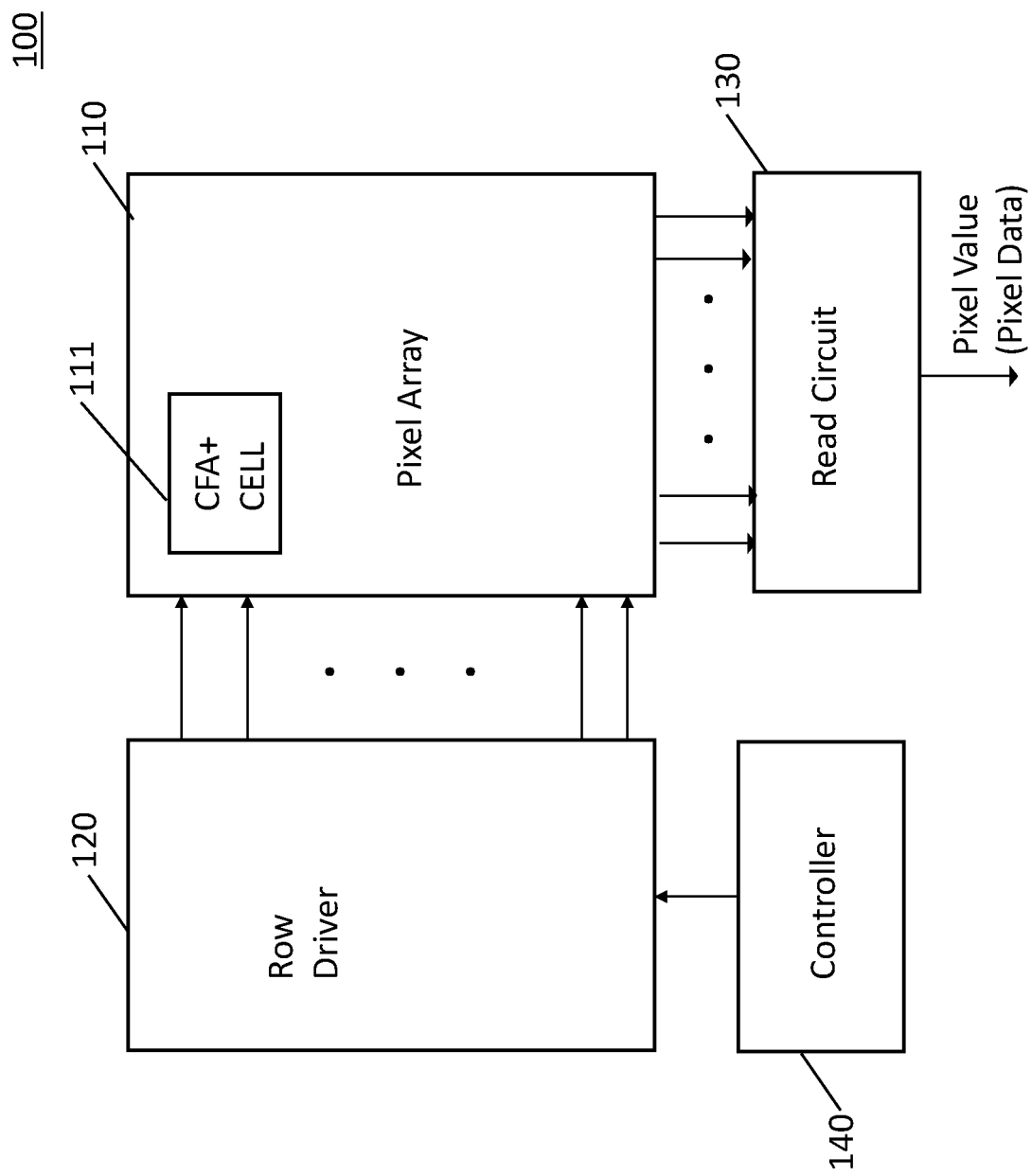
FIG. 1 is a block diagram of an image sensor including a pixel array, according to an exemplary embodiment of the present inventive concept.

Hereinafter, exemplary embodiments of the inventive concept in conjunction with accompanying drawings will be described. Below, details, such as detailed configurations and structures, are provided to aid a reader in understanding embodiments of the inventive concept. Therefore, embodiments described herein may be variously changed or modified without departing from embodiments of the inventive concept.

Modules in the drawings or the following detailed description may be connected with other modules in addition to the components described in the detailed description or illustrated in the drawings. Each connection between the modules or components may be a connection by communication or may be a physical connection.

FIG. 1 is a block diagram of an image sensor including a pixel array, according to an example embodiment of the inventive concept.

Referring to FIG. 1, an image sensor 100 may include a pixel array 110, a row driver 120, a read circuit 130, and a controller 140. The image sensor 100 may include a complementary metal-oxide semiconductor (CMOS) image sensor (CIS).

The controller 140 may control the row driver 120 and the read circuit 130. The pixel array 110 may include a plurality of pixels (e.g., color pixels). Each of the pixels may include at least one photosensitive element (not shown). The photosensitive element may sense light in each pixel and generate an electrical signal according to the intensity of the sensed light. The photosensitive element may include a photodiode, a photogate, a phototransistor, or the like. The pixel array 110 may include color pixels in various patterns, according to example embodiments. Each of the color pixels may generate, as a pixel signal, an electrical signal related to at least one color. Although not shown in FIG. 1, processing such as re-mosaicing may be performed on pixel signals of the pixel array 110, and a color pattern of the pixel array 110 may be converted by this processing into a certain pattern.

The pixel array 110 may output an electrical signal, which corresponds to light absorbed by the photosensitive element, to the read circuit 130. The row driver 120 may output a signal, which controls each of the color pixels of the pixel array 110. For example, the row driver 120 may output a signal, which resets a photosensitive element of each color pixel or controls the photosensitive element to output an electrical signal corresponding to photocharge accumulated therein.

The read circuit 130 may receive an electrical signal from the pixel array 110 and output a pixel value (or pixel data). For example, the read circuit 130 may include an analog-to-digital converter (ADC) and output, as pixel data, a digital signal corresponding to an analog signal received from the pixel array 110.

Although not shown in FIG. 1, pixel data of the image sensor 100 may be provided to an image processing unit or system or an image signal processor (ISP), and a processing operation such as re-mosaicing or binning may be performed by the image processing unit based on digital signal processing. According to example embodiments, it may be defined that a processing operation such as re-mosaicing or binning is performed by an element (e.g., a processor) of the image sensor 100 or by a separate processing unit outside the image sensor 100.

Hereinafter, some example embodiments of color pixels of the pixel array 110 will be shown according to example embodiments.

Figure 2:
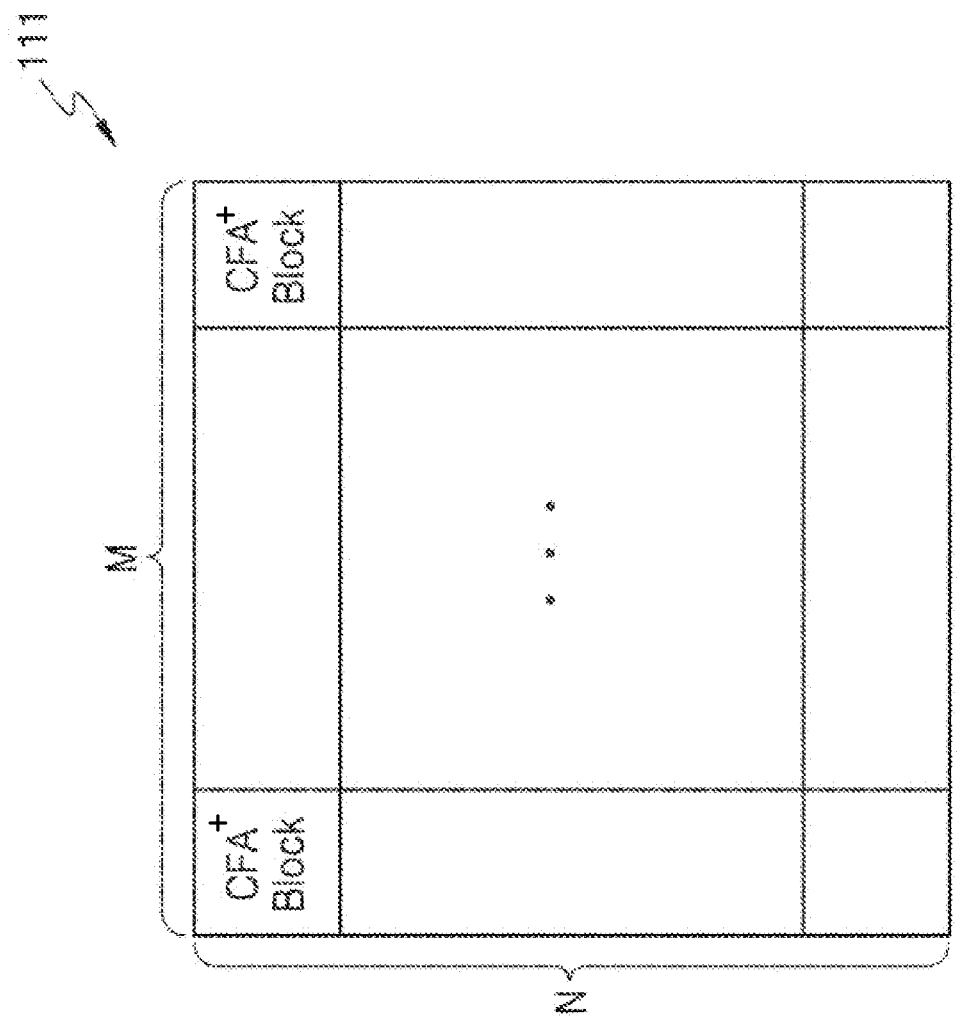
FIG. 2 is a diagram of a pixel array according to an exemplary embodiment of the present inventive concept.

FIG. 2 is a diagram of an example embodiment of a pixel array.

Referring to FIGS. 1 through 2, the image sensor 100 may include the pixel array 110, and a color filter array (CFA) may be provided in the pixel array 110 to allow a certain color to be sensed by each pixel. In the description of example embodiments below, the terms "color filter", "color pixel", "filter array", and "pixel array" may be variously defined. For example, a CFA may be defined as a separate element provided on a pixel array including a photosensitive element or as being included in a pixel array. In other words, a color pixel may be defined as including a corresponding color filter. In the description of example embodiments below, each of a CFA cell and a CFA block may be defined as including a color pixel. The CFA block cell differs from a traditional CFA block as will be explained below, and accordingly will be referred to as a CFA+ block herein. Similarly, since the CFA cell includes the CFA+ block, the CFA cell will be referred to as a CFA+ cell.

The pixel array 110 may include a plurality of CFA+ cells 111, which are defined in a certain unit. For example, the pixel array 110 may include a plurality of CFA+ cells 111 in length and width directions. Each of the CFA+ cells 111 may include color pixels having a certain size.

Each of the CFA+ cells 111 may be defined including a plurality of CFA+ blocks and may refer to a minimum structure of the same CFA blocks. FIG. 2 shows as in some example embodiments, in which a CFA cell+ 111 includes M*N CFA blocks, such that the CFA cell+ 111 includes M CFA+ blocks in the width direction and N CFA blocks in the length direction (M and N being positive integers). The number of color pixels may increase in a high-definition image sensor such as a CMOS image sensor (CIS), and accordingly, the size of the CFA+ cell 111 and the size of a CFA+ block may increase.

According to some example embodiments, a CFA+ block may be referred to as a red CFA+ block, a blue CFA+ block, or a green CFA+ block according to the kind of color pixels included therein. For example, when the number of red pixels is the highest in a CFA+ block, the CFA+ block may be referred to as a red CFA+ block. For example, when the number of green pixels is the highest in a CFA+ block, the CFA+ block may be referred to as a green CFA block. For example, when the number of blue pixels is the highest in a CFA+ block, the CFA+ block may be referred to as a blue CFA+ block.

Figure 3:
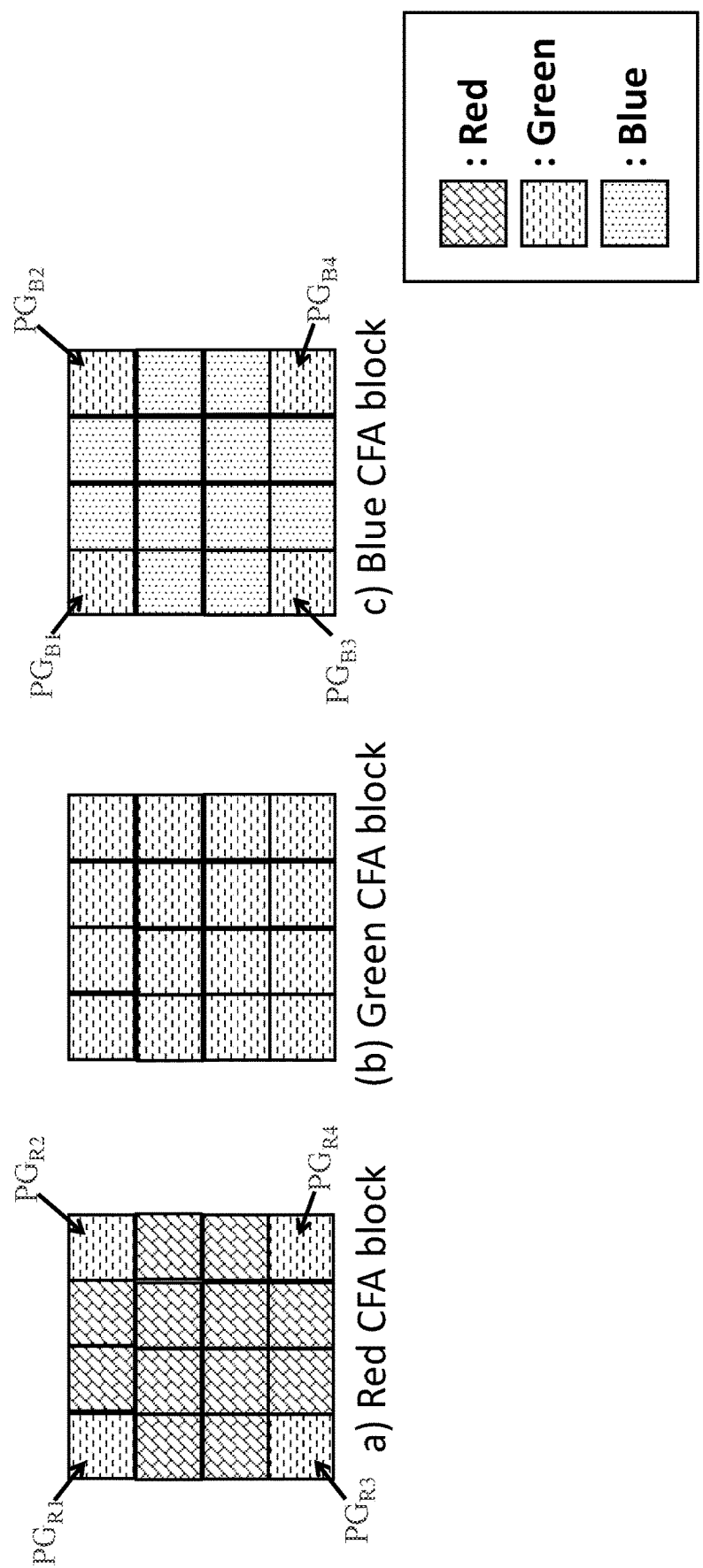
FIG. 3 illustrates CFA blocks of the pixel array according to an exemplary embodiment of the present inventive concept.
Figure 4:
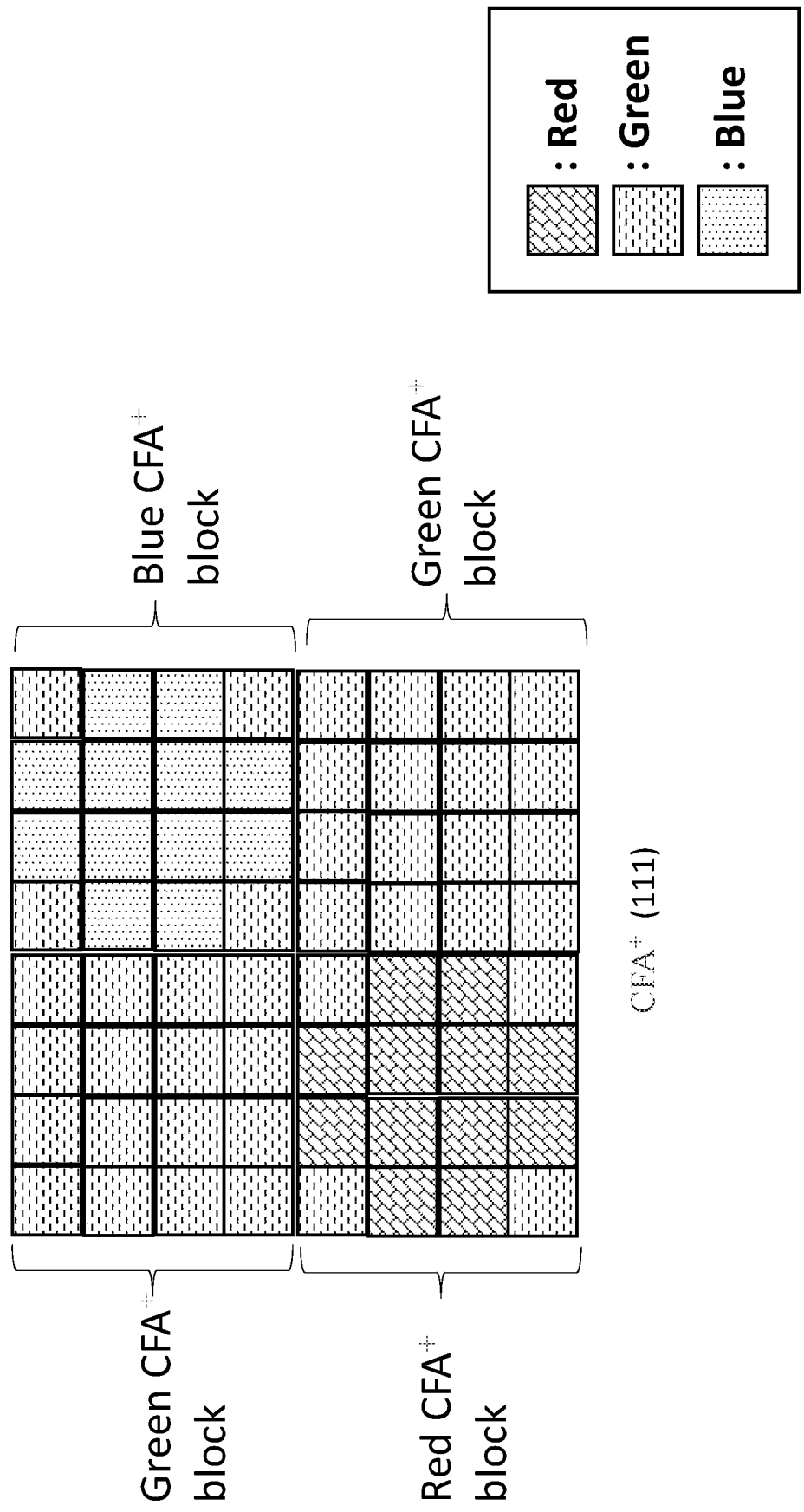
FIG. 4 illustrates a CFA cell including four of the CFA blocks according to an exemplary embodiment of the present inventive concept.

FIGS. 3 and 4 illustrates pixel arrays, according to some example embodiments. Hereinafter. CFA+ cells including 8×8 pixels are described, but the size of a CFA+ cell may be variously set in some example embodiments.

According to some example embodiments, a CFA+ cell includes four CFA+ blocks, and accordingly, each CFA+ block may include 4×4 color pixels.

In an embodiment, the Red CFA+ block includes more red pixels than green pixels. As shown in FIG. 3, in addition to the red pixels, the Red CFA block includes four green pixels $PG_{R1}$, $PG_{R2}$, $PG_{R3}$, and $PG_{R4}$ at its respective corners. The red pixels are used to sense red colored light and the green pixels are used to sense green colored light. The red pixels may be arranged into a plus shape. The red pixels in the center of the Red CFA+ block may be referred to as interior red pixels. In this embodiment, the red CFA+ block includes ten red pixels, but is not limited thereto. For example, when a larger sized CFA+ block is used like 5×5, then the red CFA+ block would include twenty-one red pixels and again the same four green pixels $PG_{R1}$, $PG_{R2}$, $PG_{R3}$, and $PG_{R4}$ at its respective corners. In the embodiment, the Blue CFA+ block includes more blue pixels than green pixels. As shown in FIG. 3, in addition to the blue pixels, the blue CFA+ block includes four green pixels $PG_{B1}$, $PG_{B2}$, $PG_{B3}$, and $PG_{B4}$ at its respective corners. The blue pixels may be arranged into a plus shape. The blue pixels are used to sense blue colored light. The blue pixels in the center of the blue CFA+ block may be referred to as interior blue pixels. In this embodiment, blue CFA+ block include ten blue pixels, but is not limited thereto. For example, when a larger sized CFA+ block is used like 5×5, then the blue CFA+ block may include twenty-one blue pixels and again the same four green pixels $PG_{B1}$, $PG_{B2}$, $PG_{B3}$, and $PG_{B4}$ at its respective corners. For an even larger sized CFA+ block such as 8×8, the size of the corners for sensing green light may increase proportionately such as from 1×1 to 2×2. In an embodiment, the Green CFA+ block includes only green pixels.

In an alternate embodiment, the red CFA+ block and the blue CFA+ block each include at least one green pixel at its corner, but not necessarily at all its corners. For example, one, two, or three of the green pixels $PG_{R1}$, $PG_{R2}$, $PG_{R3}$, and $PG_{R4}$ of the red CFA+ block could be replaced with a red pixel. For example, one, two, or three of the green pixels $PG_{B1}$, $PG_{B2}$, $PG_{B3}$, and $PG_{B4}$ of the green CFA+ blue would be replaced with a blue pixel.

A CFA+ cell 111 illustrated in FIG. 4 includes one red CFA+ block illustrated in (a) of FIG. 3, two green CFA+ blocks illustrated in (b) of FIG. 3, and one blue CFA+ block illustrated in (c) of FIG. 3.

Figure 5:
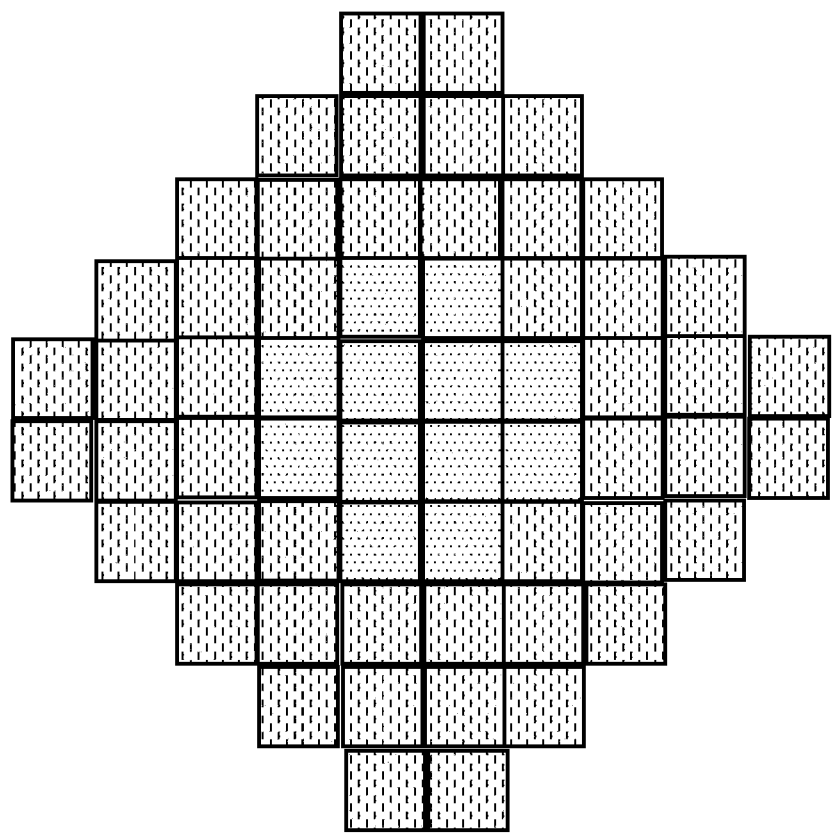
FIGS. 5 and 6 illustrate green shells around some of the CFA blocks according to an exemplary embodiment of the present inventive concept.
Figure 6:
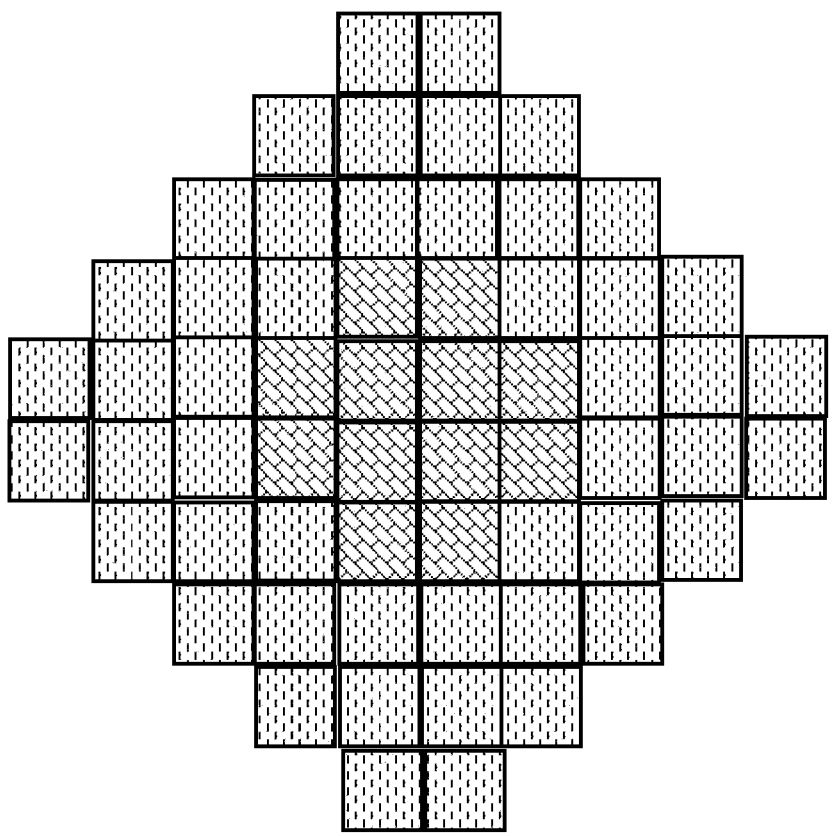

A pixel array 110 including these CFA cells⁻ 111 may be referred to as a CFA+ pixel area or a CFA+ pattern. CFA+ has 62.5% green, 18.75% red, and 18.75% blue when each CFA block is 4×4. The higher green percentage of CFA+ patterns compared to Bayer patterns with 50% green, lets more light in, under most conditions, thereby enhancing the low light capabilities of an image sensor including the pixel array 110. Furthermore, a CFA⁺ pattern (e.g., a plurality of repeated CFA⁺ cells 111), creates a green shell around red pixels in FIG. 5 and a green shell around blue pixels in FIG. 6 for true green support. Both the higher green ratio and the green shells enable better reconstruction of the full green channel, which can then be used as a guide to reconstruct the red and blue channels, which simplifies re-mosaicing.

Figure 7:
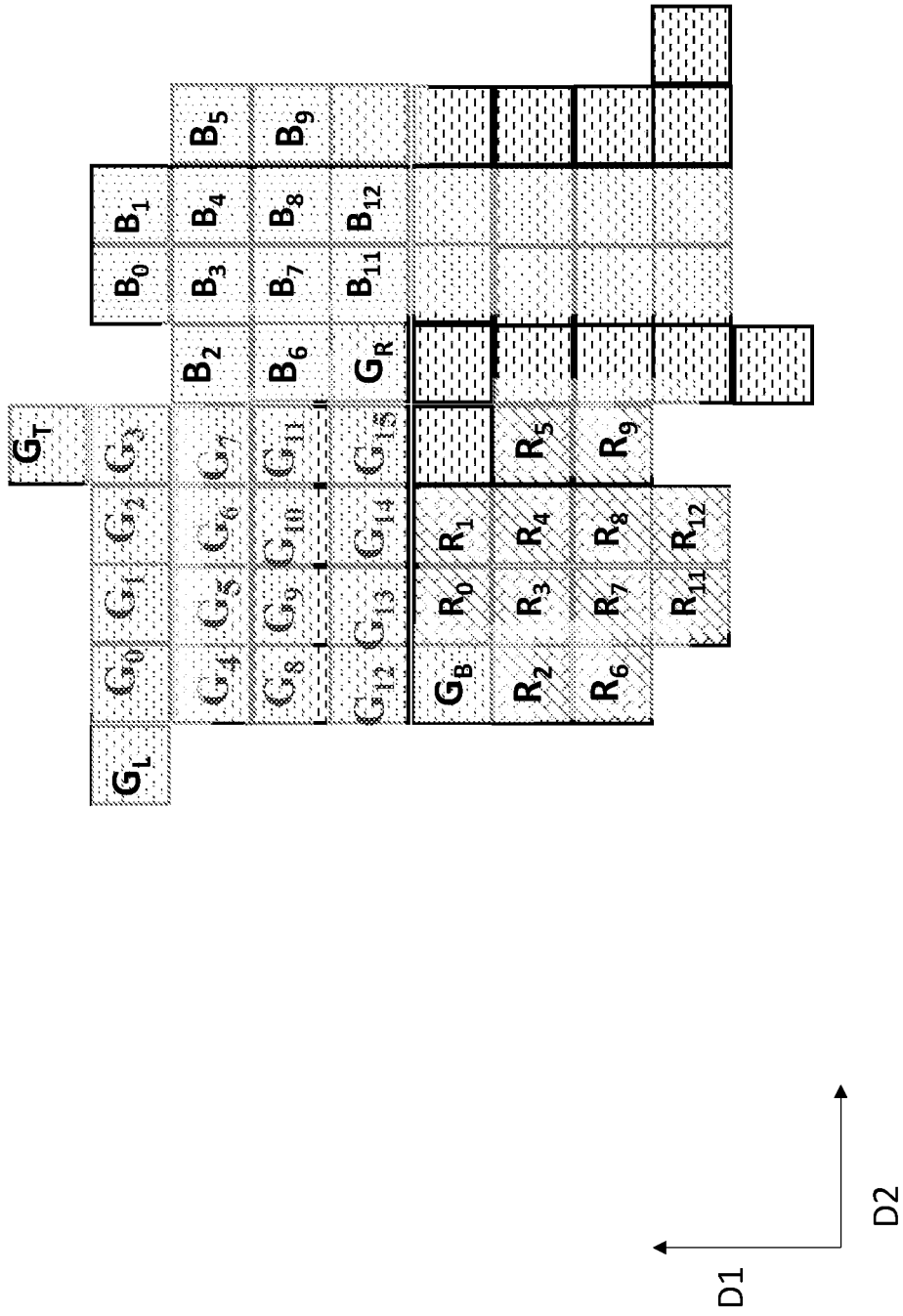
FIG. 7 illustrates a color filter array according to an exemplary embodiment of the present inventive concept.

FIG. 7 illustrates a color filter array (e.g., may also be referred to as CFA⁺) according to an exemplary embodiment of the inventive concept.

The color filter array includes a first pattern having first pixels $G_0$-$G_{15}$ for sensing light of a first color (e.g., green) arranged in an N×N matrix where N is at least 2 and second pixels $G_L$, $G_T$, $G_R$, and $G_B$ arranged at respective corners of the matrix for sensing light of the first color. The pixels of the first pattern may be shaped somewhat like a pinwheel. A left pixel $G_L$ among the second pixels may be located adjacently to the left of an upper left corner pixel $G_0$ of the matrix, a top pixel $G_T$ among the second pixels may be located adjacently above an upper right corner pixel $G_3$ of the matrix, a right pixel $G_R$ among the second pixels may be located adjacently to the right of a lower right corner pixel $G_{15}$ of the matrix, and a bottom $G_B$ pixel among the second pixels may be located adjacently below a lower left corner pixel $G_{12}$ of the matrix.

The color filter array further includes a second pattern having third pixels $R_0$-$R_{12}$ arranged into overlapping rows and columns for sensing light of a second color (e.g., red). The columns may be arranged in a first direction D1 and the rows may be arranged in a second direction D2 that crosses the first direction D1. In an embodiment, there are two rows and two columns, but the inventive concept is not limited thereto. For example, when the matrix includes more than 4×4 pixels, there may be additional rows and columns. The second pattern may be plus shaped.

The color filter array further includes a third pattern having fourth pixels $B_0$-$B_{12}$ arranged into overlapping rows and columns for sensing light of a third color (e.g., blue). The columns of the third pattern may be arranged in a first direction D1 and the rows of the third pattern may be arranged in a second direction D2 that crosses the first direction D1. In an embodiment, the third pattern includes two rows and two columns, but similar to the second pattern, the inventive concept is not limited thereto.

The color filter array may further include a fourth pattern identical to the first pattern that is adjacent the second and third patterns and diagonal to the first pattern. The first through fourth patterns of the color filter may be referred to as a cell, and the color filter array may include several of these cells.

Figure 8:
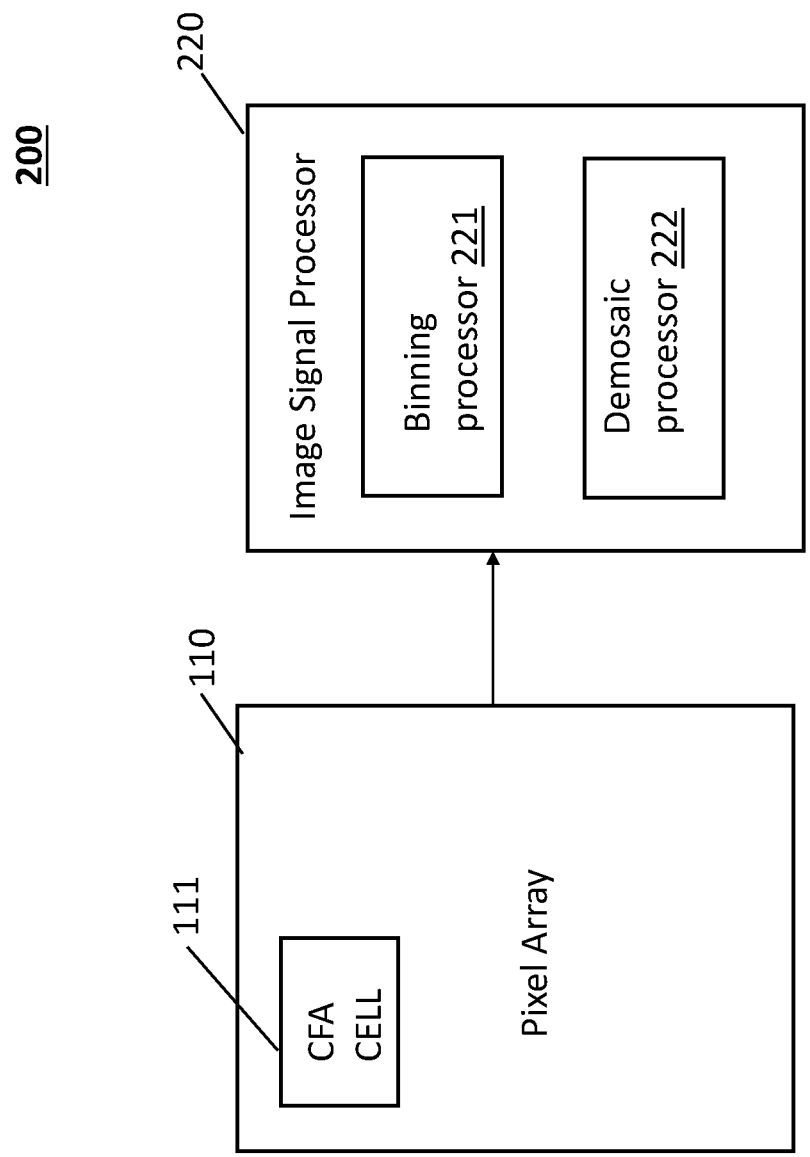
FIG. 8 illustrates an image processing system according to an exemplary embodiment of the present inventive concept.

FIG. 8 is a block diagram of an example of an image processing unit (or image processing system) including an image sensor, according to some example embodiments.

Referring to FIG. 8, an image processing unit 200 may include the pixel array 110, which includes one or more CFA⁺ cells 111, and an image signal processor (ISP) 220, which performs image processing using pixel values from the pixel array 110. According to some example embodiments, the image sensor described above may be defined as including the pixel array 110 and at least some of configurations of the image signal processor 220. For example, the image sensor may be defined as including a configuration for a binning process and/or a configuration for a de-mosaic process.

Pixel values of color pixels arranged in the pixel array 110 may be provided to the image signal processor 220. The image processor 220 may include various kinds of logic units, which process pixel values to generate image data. For example, the image signal processor 220 may include a binning processor 221 and a demosaic processor 222. Under the control of the binning processor 221, image processing may be performed using pixel values having relatively high resolution when a high-definition mode is selected or using pixel values having relatively low resolution when a low-definition mode is selected. The demosaic processor 222 may perform interpolation of a pixel in relation with a de-mosaic process.

According to some example embodiments, the binning process may be performed based on various methods. For example, the binning process may be performed based on a method, in which the image signal processor 220 performs digital addition of pixel values of color pixels of the pixel array 110. Alternatively or additionally, the binning process may be performed based on a method, in which electrical signals of at least two color pixels of the pixel array 110 are added up in an analog fashion.

According to some example embodiments, color pixels, of which the signals are added up in the binning process, may be variously selected. For example, according to an intra-block method, color pixels sensing the same color in one CFA⁺ block may be selected, and signals of the color pixels may be added up in an analog or a digital fashion. For example, all or some of color pixels sensing the same color in one CFA⁺ block may be selected.

According to an inter-block method, color pixels sensing the same color in at least two CFA⁺ blocks may be selected, and signals of the color pixels may be added up in an analog or a digital fashion. For example, signals of color pixels sensing a same color in one CFA⁺ block and in at least one row or column of an adjacent CFA block⁺ may be added up.

FIG. 9A illustrates a binning processing being performed on a green CFA⁺ block according to an exemplary embodiment of the inventive concept. The process includes summing intensities values $A_0, A_1, \ldots, A_{15}$ (or intensity charge values) of all the pixels of the green CFA⁺ block to generate a first sum, summing a first intensity value $B_0$ of a first green pixel of a first CFA block⁺ adjacent to the green CFA⁺ block, a second intensity value $B_1$ of a second green pixel of a second CFA⁺ block adjacent to the green CFA⁺ block, a third intensity value $B_3$ of a third green pixel of a third CFA⁺ block adjacent to the green CFA⁺ block, and a fourth intensity value $B_4$ of a fourth green pixel of a fourth CFA⁺ block adjacent to the green CFA⁺ block to generate a second sum, and adding the first and second sums together to generate a final sum. For example, the first adjacent CFA⁺ block may be to the left of the green CFA block⁺, the second adjacent CFA⁺ block may be above the green CFA⁺ block, the third adjacent CFA⁺ block may be to the right of the green CFA⁺ block, and the fourth adjacent CFA block may be below the green CFA⁺ block. A bin having a size of a factor times a size of the green CFA⁺ block may be set to a green color having the final sum. For example, in FIG. 9A, 20 pixels are being converted into a single pixel. Due to the red CFA⁺ block and the blue CFA⁺ block, more area on an image sensor including the CFA⁺ cells 111 is dedicated to green pixels. Therefore, more electrons (due to higher spectral responsivity of the green pixels) contribute to the binned image and hence a higher signal to noise ratio (SNR) is achieved.

FIG. 9B illustrates another binning processing being performed on a green CFA⁺ block according to an exemplary embodiment of the inventive concept. This embodiment is similar to that of FIG. 9A, but the pixels for sensing green light outside the N×N matrix of pixels for sensing light having the intensity values of $B_0$-$B_3$ are omitted from the sum. For example, the binning process only includes summing intensities values $A_0, A_1, \ldots, A_{15}$. Thus, 16 green pixels are converted into a bin of a single pixel.

FIG. 9C illustrates a binning process that may be applied to the red channel or the blue channel. For example, since the red and blue patterns are plus shaped, it is only necessary to sum twelve intensity values $C_0, C_1, \ldots,$ and $C_{11}$ when the plus shaped pattern has 12 pixels as shown in FIG. 9C. When a CFA+ block is larger, for example, when the green CFA+ block is 5×5, the binning process may sum twenty one intensity values of a corresponding plus shaped pattern.

FIG. 9D illustrates another binning process that may be applied to the red channel or the blue channel. In FIG. 9D, the red or the blue pattern including 12 pixels is binned along with the 4 green corner pixels. For example, the bin is generated by summing the twelve red or blue intensity values $C_0, C_1, \ldots,$ and $C_{11}$ with the intensity values $B_3, B_4, B_5,$ and $B_6$ of the 4 green corner pixels.

Figure 10:
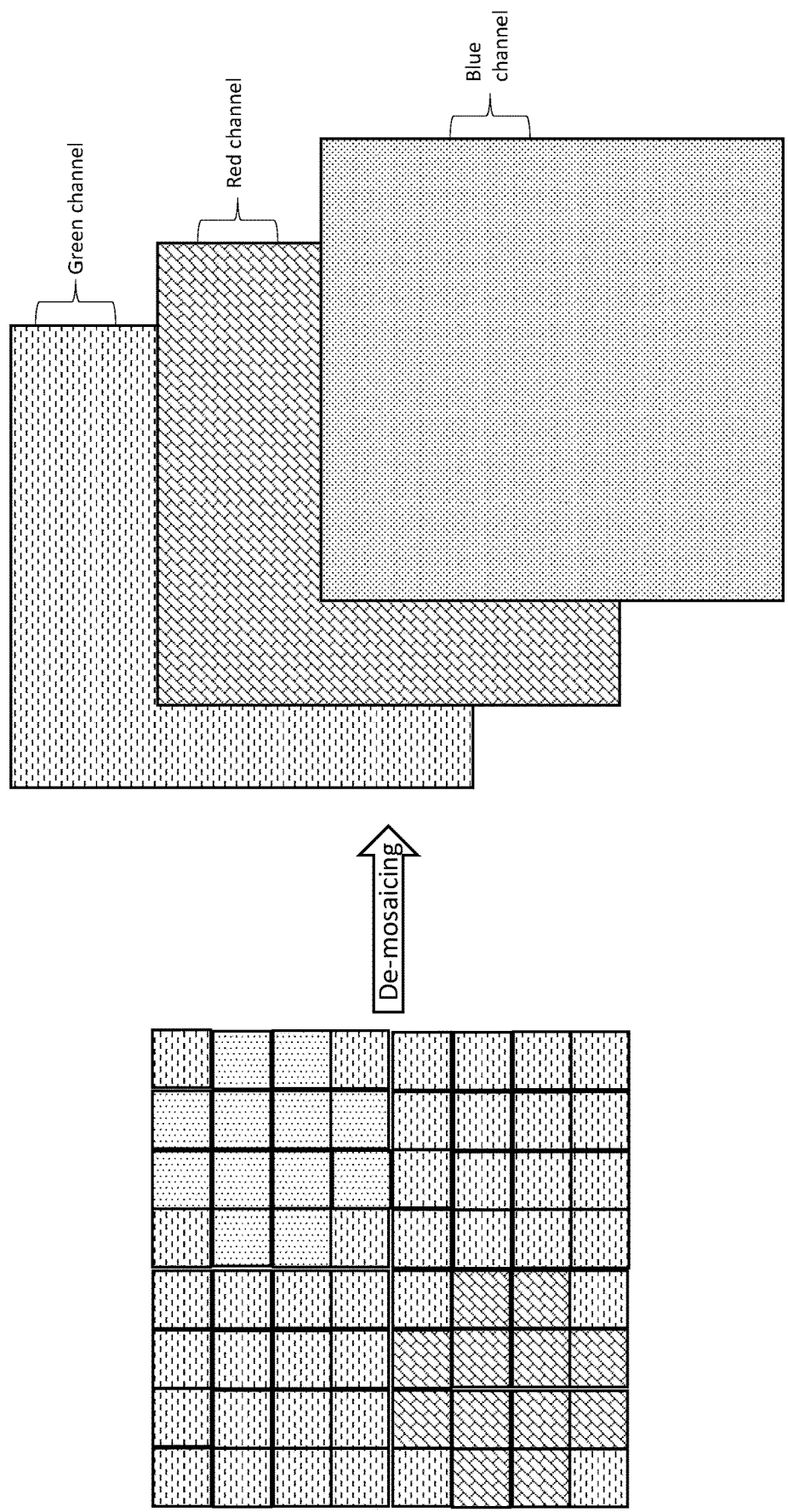
FIG. 10 illustrates de-mosaicing that may be performed on pixel data of the pixel array according to an exemplary embodiment of the inventive concept.

FIG. 10 illustrates a de-mosaicing process. In de-mosaicing, red, green, and blue maps are created from the CFA+ pattern. The de-mosaicing includes red, green, and blue map completion. In the red map completion, a red color is estimated for each pixel in a CFA+ block that is green or blue from one or more closest neighboring red pixels in one or one or more neighboring CFA+ blocks. In the green map completion, a green color is estimated for each pixel in a CFA+ block that is red or blue from one or more closest neighboring green pixels in one or more closest neighboring CFA+ blocks. In the blue map completion, a blue color is estimated for each pixel in a CFA+ block that is green or red from one or more closest neighboring blue pixels in one or more closest neighboring CFA+ blocks. The closer the neighbors are, the more precise the estimation becomes. In a 4×4 CFA+ block, all red and blue pixels are adjacent at least one green neighbor pixel. For example, the outermost red and blue pixels are adjacent green pixels horizontally, vertically, and diagonally and the inner most red and blue pixels are adjacent a single green pixel diagonally. Since all red and blue pixels are adjacent at least one green neighbor pixel, interpolation quality may be greatly improved. In red and blue map completion, the interpolation contends with larger interpolation strides. However, since red and blue provide less significant detail due to carrying less spatial frequency content (i.e., colors very slower across the image), larger interpolation strides are more acceptable here. After the maps are generated, a refinement process may be performed. The refinement process deals with fixing interpolation errors generated by the green, blue, and red map completions. The refinement may try to fix high frequency miss estimations that are mostly based on the green map. The green map generated by CFA+ allows for less error and hence refinement is less complicated and takes less time.

Figure 11A:
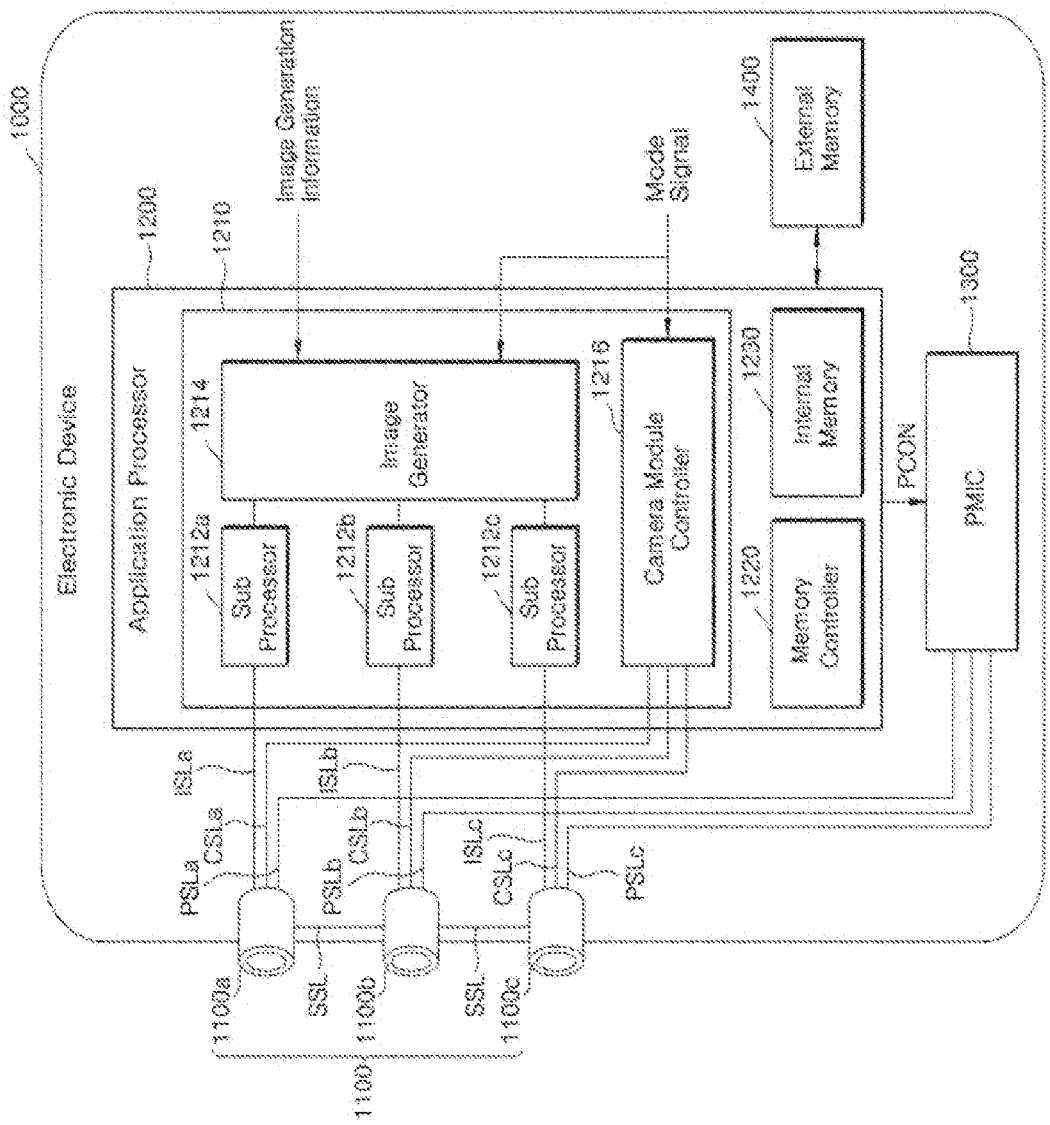
FIGS. 11A and 11B are block diagrams of an electronic device including a multi-camera module using an image sensor, according to some example embodiments.
Figure 11B:
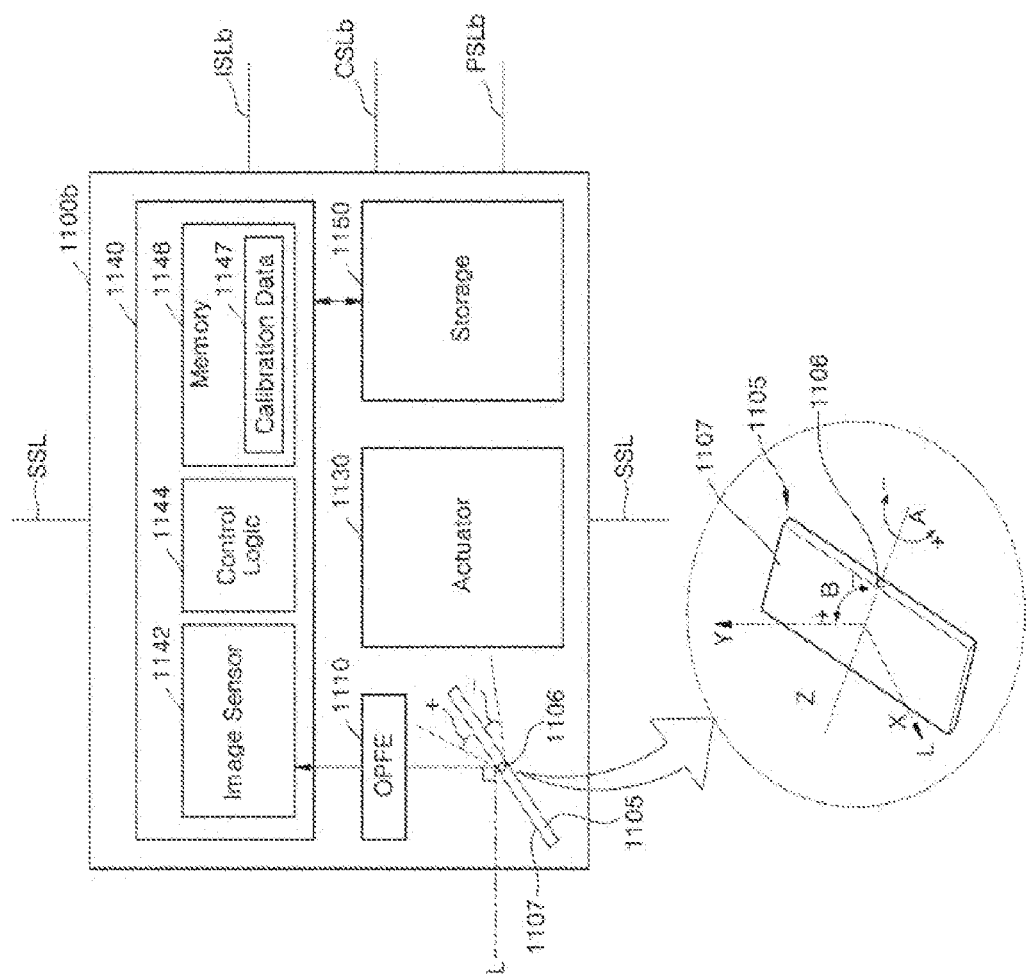

FIG. 11A is a block diagram of an electronic device including a multi-camera module using an image sensor, according to some example embodiments. FIG. 11B is a detailed block diagram of a camera module in FIG. 11A.

Referring to FIG. 11A, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. Although three camera modules 1100a, 1100b, and 1100c are illustrated in FIG. 10, example embodiments are not limited thereto. In some example embodiments, the camera module group 1100 may be modified to include only two camera modules. In some example embodiments, the camera module group 1100 may be modified to include "n" camera modules, where "n" is a natural number of at least 4.

The detailed configuration of the camera module 1100b will be described with reference to FIG. 11B below. The descriptions below may also applied to the other camera modules 1100a and 1100c.

Referring to FIG. 11B, the camera module 1100b may include a prism 1105, an optical path folding element (OPFE) 1110, an actuator 1130, an image sensing device 1140, and a storage 1150.

The prism 1105 may include a reflective surface 1107 of a light reflecting material and may change the path of light L incident from outside.

In some example embodiments, the prism 1105 may change the path of the light L incident in a first direction X into a second direction Y perpendicular to the first direction X. The prism 1105 may rotate the reflective surface 1107 of the light reflecting material in a direction A around a central shaft 1106 or rotate the central shaft 1106 in a direction B so that the path of the light L incident in the first direction X is changed into the second direction Y perpendicular to the first direction X. At this time, the OPFE 1110 may move in a third direction Z, which is perpendicular to the first and second directions X and Y.

In some example embodiments, an A-direction maximum rotation angle of the prism 1105 may be less than or equal to 15 degrees in a plus (+) A direction and greater than 15 degrees in a minus (−) A direction, but embodiments are not limited thereto.

In some example embodiment, the prism 1105 may move by an angle of about 20 degrees or in a range from about 10 degrees to about 20 degrees or from about 15 degrees to about 20 degrees in a plus or minus B direction. At this time, an angle by which the prism 1105 moves in the plus B direction may be the same as or similar, within a difference of about 1 degree, to an angle by which the prism 1105 moves in the minus B direction.

In some example embodiments, the prism 1105 may move the reflective surface 1107 of the light reflecting material in the third direction Z parallel with an extension direction of the central shaft 1106.

The OPFE 1110 may include, for example, "m" optical lenses, where "m" is a natural number. The "m" lenses may move in the second direction Y and change an optical zoom ratio of the camera module 1100b. For example, when the default optical zoom ratio of the camera module 1100h is Z, the optical zoom ratio of the camera module 1100h may be changed to 3Z, 5Z, or greater by moving the "m" optical lenses included in the OPFE 1110.

The actuator 1130 may move the OPFE 1110 or an optical lens to a certain position. For example, the actuator 1130 may adjust the position of the optical lens such that an image sensor 1142 is positioned at a focal length of the optical lens for accurate sensing.

The image sensing device 1140 may include the image sensor 1142, a control logic 1144, and a memory 1146. The image sensor 1142 may sense an image of an object using the light L provided through the optical lens. According to some example embodiments described above, the image sensor 1142 may include a pixel array, and a color pattern of a plurality of color pixels of the pixel array may follow the patterns of a CFA cell, a CFA block, and a sub block in some example embodiments described above.

The control logic 1144 may generally control operations of the camera module 1100b. For example, the control logic 1144 may control operation of the camera module 1100b according to a control signal provided through a control signal line CSLb.

The memory 1146 may store information, such as calibration data 1147, necessary for the operation of the camera module 1100b. The calibration data 1147 may include information, which is necessary for the camera module 1100h to generate image data using the light L provided from outside. For example, the calibration data 1147 may include information about the degree of rotation described above, information about a focal length, information about an optical axis, or the like. When the camera module 1100b is implemented as a multi-state camera that has a focal length varying with the position of the optical lens, the calibration data 1147 may include a value of a focal length for each position (or state) of the optical lens and information about auto focusing.

The storage 1150 may store image data sensed by the image sensor 1142. The storage 1150 may be provided outside the image sensing device 1140 and may form a stack with a sensor chip of the image sensing device 1140. In some embodiments, the storage 1150 may include electrically erasable programmable read-only memory (EEPROM), but embodiments are not limited thereto.

In some example embodiments, each of the camera modules 1100a, 1100b, and 1100c may include the actuator 1130. Accordingly, the camera modules 1100a, 11001b, and 1100c may include the calibration data 1147, which is the same or different among the camera modules 1100a, 1100b, and 1100c according to the operation of the actuator 1130 included in each of the camera modules 1100a, 1100b, and 1100c.

In some example embodiments, one (e.g., the camera module 1100b) of the camera modules 1100a, 1100b, and 1100c may be of a folded-lens type including the prism 1105 and the OPFE 1110 while the other camera modules (e.g., the camera modules 1100a and 1100c) may be of a vertical type that does not include the prism 1105 and the OPFE 1110. However, example embodiments are not limited thereto.

In some example embodiments, one (e.g., the camera module 1100c) of the camera modules 1100a, 1100b and 1100c may include a vertical depth camera, which extracts depth information using an infrared ray (IR). In this case, the application processor 1200 may generate a three-dimensional (3D) depth image by merging image data provided from the depth camera with image data provided from another camera module (e.g., the camera module 1100a or 1100b).

In some example embodiments, at least two camera modules (e.g., 1100a and 1100b) among the camera modules 1100a, 1100b, and 1100c may have different field-of-views. In this case, the two camera modules (e.g., 1100a and 1100b) among the camera modules 1100a, 1100h, and 1100c may respectively have different optical lenses, but embodiments are not limited thereto.

In some example embodiments, the camera modules 1100a, 1100b, and 1100c may have different field-of-views from one another. In this case, the camera modules 1100a, 1100h, and 1100c may respectively have different optical lenses, but embodiments are not limited thereto.

In some example embodiments, the camera modules 1100a, 1100b, and 1110c may be physically separated from one another. In other words, the sensing area of the image sensor 1142 is not divided and used by the camera modules 1100a, 1100b, and 1100c, but the image sensor 1142 may be independently included in each of the camera modules 1100a, 1100b and 1100c.

Referring back to FIG. 10, the application processor 1200 may include an image processing unit 1210, a memory controller 1220, and an internal memory 1230. The application processor 1200 may be separately implemented from the camera modules 1100a, 1100b and 1100c. For example, the application processor 1200 and the camera modules 1100a, 1100b, and 1100c may be implemented in different semiconductor chips.

The image processing unit 1210 may include a plurality of sub processors 1212a, 1212b, and 1212c, an image generator 1214, and a camera module controller 1216.

The image processing unit 1210 may include as many sub processors 1212a, 1212b, and 1212c as the camera modules 1100a, 1100b, and 1100c.

Image data generated from each camera module 1100a, 1100b, or 1100c may be provided to a corresponding one of the sub processors 1212a, 1212b, and 1212c through a corresponding one of separate image signal lines ISLa, ISLb, and ISLc. For example, image data generated from the camera module 1100a may be provided to the sub processor 1212a through the image signal line IS La, image data generated from the camera module 1100b may be provided to the sub processor 1212b through the image signal line ISLb, and image data generated from the camera module 1100c may be provided to the sub processor 1212c through the image signal line ISLc. Such image data transmission may be performed using, for example, a mobile industry processor interface (MIPI) based camera serial interface (CSI), but embodiments are not limited thereto.

In some example embodiments, a single sub processor may be provided for a plurality of camera modules. For example, differently from FIG. 10, the sub processors 1212a and 1212c may not be separated but may be integrated into a single sub processor, and the image data provided from the camera module 1100a or the camera module 1100c may be selected by a selection element (e.g., a multiplexer) and then provided to the integrated sub processor.

The image data provided to each of the sub processors 1212a, 1212b, and 1212c may be provided to the image generator 1214. The image generator 1214 may generate an output image using the image data provided from each of the sub processors 1212a, 1212b, and 1212c according to image generation information or a mode signal.

In detail, the image generator 1214 may generate the output image by merging at least portions of respective pieces of image data, which are respectively generated from the camera modules 1100a, 1100h, and 1100c having different field-of-views, according to the image generation information or the mode signal. Alternatively or additionally, the image generator 1214 may generate the output image by selecting one of pieces of image data, which are respectively generated from the camera modules 1100a, 1100b, and 110c having different field-of-views, according to the image generation information or the mode signal.

In some example embodiments, the image generation information may include a zoom signal or a zoom factor. In some example embodiments, the mode signal may be based on a mode selected by a user.

When the image generation information includes a zoom signal or a zoom factor and the camera modules 1100a, 1100b, and 1100c have different field-of-views, the image generator 1214 may perform different operations according to different kinds of zoom signals. For example, when the zoom signal is a first signal, the image generator 1214 may merge image data output from the camera module 1100a with image data output from the camera module 1100c and then generate an output image using a merged image signal and image data output from the camera module 1100b, which has not been used in the merging. When the zoom signal is a second signal different from the first signal, the image generator 1214 may not perform this image data merging but select one of pieces of image data respectively output from the camera modules 1100a through 1100c to generate an output image. However, example embodiments are not limited thereto, and a method of processing image data may be changed whenever necessary.

In some example embodiments, the image generator 1214 may receive a plurality of pieces of image data, which have different exposure times, from at least one of the sub processors 1212a, 1212b, and 1212c and perform high dynamic range (HDR) processing on the pieces of image data, thereby generating merged image data having an increased dynamic range.

The camera module controller 1216 may provide a control signal to each of the camera modules 1100a, 1100b, and 1100c. A control signal generated by the camera module controller 1216 may be provided to a corresponding one of the camera modules 1100a, 1100b, and 1100c through a corresponding one of control signal lines CSLa, CSLb, and CSLc, which are separated from one another.

One (e.g., the camera module 1100b) of the camera modules 1100a, 11100h and 1100c may be designated as a master camera according to the mode signal or the image generation signal including a zoom signal, and the other camera modules (e.g., 1100a and 1100c) may be designated as slave cameras. Such designation information may be included in a control signal and provided to each of the camera modules 1100a, 1100b, and 1100c through a corresponding one of the control signal lines CSLa, CSLb, and CSLc, which are separated from one another.

A camera module operating as a master or a slave may be changed according to a zoom factor or an operation mode signal. For example, when the field-of-view of the camera module 1100a is greater than that of the camera module 1100b and the zoom factor indicates a low zoom ratio, the camera module 1100b may operate as a master and the camera module 1100a may operate as a slave. Contrarily, when the zoom factor indicates a high zoom ratio, the camera module 1100a may operate as a master and the camera module 1100b may operate as a slave.

In some example embodiments, a control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit the sync enable signal to the camera module 1100b. The camera module 1100b provided with the sync enable signal may generate a sync signal based on the sync enable signal and may provide the sync signal to the camera modules 1100a and 1100c through a sync signal line SSL. The camera modules 1100a, 1100b, and 1100c may be synchronized with the sync signal and may transmit image data to the application processor 1200.

In some example embodiments, a control signal provided from the camera module controller 1216 to each of the camera modules 1100a, 1100b, and 1100c may include mode information according to the mode signal. The camera modules 1100a, 1100b, and 1100c may operate in a first operation mode or a second operation mode in relation with a sensing speed based on the mode information.

In the first operation mode, the camera modules 1100a, 1100b, and 1100c may generate an image signal at a first speed (e.g., at a first frame rate), encode the image signal at a second speed higher than the first speed (e.g., at a second frame rate higher than the first frame rate), and transmit an encoded image signal to the application processor 1200. At this time, the second speed may be at most 30 times the first speed.

The application processor 1200 may store the received image signal, e.g., the encoded image signal, in the internal memory 1230 therein or the external memory 1400 outside the application processor 1200. Thereafter, the application processor 1200 may read the encoded image signal from the internal memory 1230 or the external memory 1400, decode the encoded image signal, and display image data generated based on a decoded image signal. For example, a corresponding one of the sub processors 1212a, 1212b, and 1212c of the image processing unit 1210 may perform the decoding and may also perform image processing on the decoded image signal.

In the second operation mode, the camera modules 1100a, 1100b, and 1100c may generate an image signal at a third speed lower than the first speed (e.g., at a third frame rate lower than the first frame rate) and transmit the image signal to the application processor 1200. The image signal provided to the application processor 1200 may not have been encoded. The application processor 1200 may perform image processing on the image signal or store the image signal in the internal memory 1230 or the external memory 1400.

The PMIC 1300 may provide power, e.g., a power supply voltage, to each of the camera modules 1100a, 1100b, and 1100c. For example, under the control of the application processor 1200, the PMIC 1300 may provide first power to the camera module 1100a through a power signal line PSLa, second power to the camera module 1100b through a power signal line PSLb, and third power to the camera module 1100c through a power signal line PSLc.

The PMIC 1300 may generate power corresponding to each of the camera modules 1100a, 1100b, and 1100c and adjust the level of the power, in response to a power control signal PCON from the application processor 1200. The power control signal PCON may include a power adjustment signal for each operation mode of the camera modules 1100a. 1100b, and 1100c. For example, the operation mode may include a low-power mode. At this time, the power control signal PCON may include information about a camera module to operate in the low-power mode and a power level to be set. The same or different levels of power may be respectively provided to the camera modules 1100a, 1100h, and 1100c. The level of power may be dynamically changed.

It will be understood that some or all of any of the devices, controllers, generators, decoders, units, modules, circuits, processors, or the like according to any of the example embodiments as described herein, including some or all of any of the elements of the controller 140 and read circuit 130 shown in FIG. 1, the image processor 220, binning processor 221, and remosaic processor 222 shown in FIG. 8, the application processor 1200 and its sub elements shown in FIG. 11A, the image sensing device 1140 and its sub elements shown in FIG. 11B, any combination thereof, or the like may be included in, may include, and/or may be implemented by one or more instances of processing circuitry such as hardware including logic circuits, a hardware/software combination such as a processor executing software; or a combination thereof. In some example embodiments, said one or more instances of processing circuitry may include, but are not limited to, a central processing unit (CPU), an application processor (AP), an arithmetic logic unit (ALU), a graphic processing unit (GPU), a digital signal processor, a microcomputer, a field programmable gate array (FPGA), a System-on-Chip (SoC) a programmable logic unit, a microprocessor, or an application-specific integrated circuit (ASIC), etc. In some example embodiments, any of the memories, memory units, or the like as described herein may include a non-transitory computer readable storage device, for example a solid state drive (SSI), storing a program of instructions, and the one or more instances of processing circuitry may be configured to execute the program of instructions to implement the functionality of some or all of any of the devices, controllers, decoders, units, modules, or the like according to any of the example embodiments as described herein, including any of the methods of operating any of same as described herein.

Although each of the elements of the controller 140 and read circuit 130 shown in FIG. 1, the image processor 220, binning processor 221, and remosaic processor 222 shown in FIG. 8, the application processor 1200 and its sub elements shown in FIG. 11A, the image sensing device 1140 and its sub elements shown in FIG. 11B are illustrated as being distinct, example embodiments are not limited thereto, and some of the functions of one of the above may be performed by others of the features of the relevant figures. This may also be the case of additional elements within the above as described in example embodiments herein.

At least one embodiment of the inventive concept provides an image sensor with enhanced light sensitivity. The green channel is about 30% more sensitive than the red channel and about 60% more sensitive than the blue channel. An image sensor with CFA+ is about 10% more sensitive overall compared to a common Bayer multiplexed CFA.

At least one embodiment of the inventive concept provides an image sensor with increased image quality. An image sensor with CFA+ utilizes the benefits of high resolution full green reconstruction for enhanced low light and general image quality performances. For example, when a cubic Hermite interpolator is applied on the green channel of the CFA+, the reconstructed green channel shows significantly less speckless as compared to a common Bayer color filter array. Further, when binning is applied to the CFA+, the resulting image experiences an increase in luminance as compared to a common Bayer color filter array.

At least one embodiment of the inventive concept provides an image sensor with increased power efficiency. Image sensors include several types of pixels that cannot be relied on due factory defects, burned pixels, and auto focus pixels. The high green ratio in CFA+ and green shell shape compensates for these losses better. Thus, any recovering mechanisms used will use less power.

While embodiments of color filters including red, green, and blue color filters have been described above, the inventive concept is not limited thereto. In an alternate embodiment of FIG. 7, the two green patterns are replaced with white patterns includes pixels that sense white light instead of green light. In another alternate embodiment of FIG. 7, the patterns sense cyan light, magenta light, and yellow light instead of green light, red light, and blue light. For example, the two green patterns could be replaced with pixels that sense cyan light, magenta light, and yellow light, and the red and green patterns could be replaced with pixels that sensing magenta light and yellow light, respectively. Further, while a CFA unit cell that repeats in FIG. 7 is depicted as including 2 patterns to sense light a first color (e.g., green), 1 pattern to sense light of a second color (e.g., red), and 1 pattern to sense light of a third color (e.g., blue), the inventive concept is not limited thereto. For example, in an alternate embodiment, one of the 2 patterns to sense the first light is omitted so that a CFA unit cell includes 1 pattern to sense the light of the first color, 1 pattern to sense the light of the second color, and 1 pattern to sense the light of the third color. In another embodiment, the CFA unit cell of FIG. 7 is modified to include at least one another pattern that more sense the light of the first color or light of a fourth color different from the first through third colors such as white light.

While embodiments of red/blue patterns or red/blue CFA+ blocks have been depicted as having extra green pixels at corner locations, the inventive concept is not limited thereto. For example, the extra green pixels may be perimeter pixels at locations other than a corner such a middle outer pixel that is adjacent to a corner pixel. Further, the extra green pixels of a red/blue pattern or a red/blue CFA+ block may include a combination of one or more corner pixels and one or more middle outer pixels.

While the inventive concepts have been particularly shown and described with reference to embodiments thereof, it will be understood that various changes in form and details may be made therein without departing from the spirit and scope of the following claims.

What is claimed is:

1. A pixel array of an image sensor, the pixel array comprising: a plurality of color filter array (CFA) cells, each of the plurality of CFA cells include first, second, third, and fourth CFA blocks, wherein each of the first and second CFA blocks includes a plurality of pixels to sense light of a first color, wherein most pixels of the third CFA block are configured to sense light of a second color and the third CFA block includes at least one first pixel to sense light of the first color, wherein most pixels of the fourth CFA block are configured to sense light of a third color and the fourth CFA block includes at least one second pixel to sense light of the first color, wherein the third CFA block includes at least one pixel located in a corner position among four corners of the third CFA block configured to sense light of the first color and all remaining pixels of the third CFA block are configured to sense light of the second color and wherein the third CFA block is directly adjacent an N×N arrangement of the plurality of pixels of the first color of the first CFA block, where N is at least 3.

2. The pixel array of claim 1, wherein the at least one first pixel is located on a corner of the third CFA block and the at least one second pixel is located on a corner of the fourth CFA block.

3. The pixel array of claim 2, wherein the at least one first pixel includes four pixels at respective corners of the third CFA block and the at least one second pixel includes four pixels at respective corners of the fourth CFA block.

4. The pixel array of claim 1, wherein the first color is green, the second color is red, and the third color is blue.

5. The pixel array of claim 1, wherein each of the CFA blocks is a 4×4 arrangement of pixels.

6. The pixel array of claim 1, wherein the pixels of the first and second CFA blocks only sense light of the first color.

7. The pixel array of claim 1,
wherein the fourth CFA block includes at least one pixel located in a corner position among four corners of the fourth CFA block configured to sense light of the first color and all remaining pixels of the fourth CFA block are configured to sense light of the third color.

8. A pixel array of an image sensor, the pixel array comprising:
- a plurality of color filter array (CFA) cells, each of the plurality of CFA cells including a first pattern, a second pattern, and a third pattern,
- wherein the first pattern includes a plurality of first pixels to sense light of a first color, the first pixels including pixels arranged in an N×N matrix and pixels adjacent respective corners of the matrix,
- where N is at least 2,
- wherein the second pattern includes a plurality of second pixels numbering less than the first pixels to sense light of a second color, and
- wherein the third pattern includes a plurality of third pixels numbering less than the first pixels to sense light of a third color,
- wherein the pixels adjacent the respective corners include a left pixel located adjacently left of an upper left corner pixel of the matrix, an upper pixel located adjacently above an upper right corner pixel of the matrix, a right pixel located adjacent right of a lower right corner of the matrix, and a bottom pixel located adjacently below a lower left corner pixel of the matrix.

9. The pixel array of claim 8, wherein the pixels in each of the second pattern and the third pattern are arranged into overlapping rows and columns.

10. The pixel array of claim 8, wherein each of the plurality of CFA cells includes a fourth pattern identical to the first pattern.

11. The pixel array of claim 8, wherein the second pattern includes a plurality of second pixels arranged into a plus shape to sense light of a second color, wherein the third pattern includes a plurality of third pixels arranged into the plus shape to sense light of a third color.

* * * * *